US012645107B2

(12) United States Patent
Chen et al.

(10) Patent No.: US 12,645,107 B2
(45) Date of Patent: Jun. 2, 2026

(54) PARAFFINIC COMPOUND ADDITION TO LIQUID CRYSTALS FOR REDUCED SWITCHING VOLTAGE ON NCAP-BASED ELECTRO-OPTICAL MODULATOR

(71) Applicant: Orbotech Ltd., Yavne (IL)

(72) Inventors: Charlie Xiaomao Chen, San Ramon, CA (US); Karla Gutierrez Cuevas, San Jose, CA (US); Jason S. Reid, San Jose, CA (US)

(73) Assignee: Orbotech Ltd., Yavne (IL)

( * ) Notice: Subject to any disclaimer, the term of this patent is extended or adjusted under 35 U.S.C. 154(b) by 387 days.

(21) Appl. No.: 18/208,553

(22) Filed: Jun. 12, 2023

(65) Prior Publication Data

US 2024/0411159 A1      Dec. 12, 2024

(51) Int. Cl.
| | |
|---|---|
| *G02F 1/061* | (2006.01) |
| *C09K 19/54* | (2006.01) |
| *G02F 1/00* | (2006.01) |
| *G02F 1/137* | (2006.01) |

(52) U.S. Cl.
CPC ............ *G02F 1/061* (2013.01); *C09K 19/542* (2013.01); *G02F 1/0018* (2013.01); *G02F 1/13775* (2021.01); *C09K 2019/546* (2013.01)

(58) Field of Classification Search
CPC .... G02F 1/061; G02F 1/13775; C09K 19/542
See application file for complete search history.

(56) References Cited

U.S. PATENT DOCUMENTS

| | | | |
|---|---|---|---|
| 5,760,860 A | 6/1998 | Mason et al. | |
| 7,265,903 B2 * | 9/2007 | Sutherland | C09K 19/544 |
| | | | 359/489.08 |
| 7,639,319 B2 | 12/2009 | Chen | |
| 7,817,333 B2 | 10/2010 | Chen | |
| 8,801,964 B2 | 8/2014 | Chen | |
| 8,992,796 B2 | 3/2015 | Hasebe et al. | |
| 2006/0170853 A1 | 8/2006 | Jeong et al. | |

(Continued)

FOREIGN PATENT DOCUMENTS

| | | | |
|---|---|---|---|
| CN | 1227838 A | 9/1999 | |
| CN | 102414345 A * | 4/2012 | ............... C25B 1/02 |

(Continued)

OTHER PUBLICATIONS

Kizhakidathazhath et al., "High-Performance Polymer Dispersed Liquid Crystal Enabled by Uniquely Designed Acrylate Monomer," Polymers 2020, 12, 1625, Jul. 22, 2020, 10 pages.

(Continued)

*Primary Examiner* — Lucy P Chien
(74) *Attorney, Agent, or Firm* — Suiter Swantz IP

(57)      ABSTRACT

An electro-optic modulator is disclosed with reduced switching voltage. The electro-optic modulator includes a modulator material film layer. The modulator material film layer includes a polymer matrix. Droplets of liquid crystals are dispersed within the polymer matrix. The liquid crystals are configured to modulate light transmissivity through the electro-optic modulator. Alkanes are dispersed within the droplets. The alkane additives reduce the switching voltage of the electro-optic modulator. n-decane and mineral oil compositions are experimentally demonstrated to reduce the switching voltage.

29 Claims, 5 Drawing Sheets

100

(56)                References Cited

U.S. PATENT DOCUMENTS

| | | |
|---|---|---|
| 2006/0286309 A1 | 12/2006 | Chari et al. |
| 2012/0162596 A1 | 6/2012 | Chen |
| 2015/0275090 A1 | 10/2015 | Wang |
| 2018/0216286 A1* | 8/2018 | Glassmeyer ............. B32B 5/02 |

FOREIGN PATENT DOCUMENTS

| | | | |
|---|---|---|---|
| CN | 102540544 A * | 7/2012 | ............ C09K 19/38 |
| CN | 104726107 A | 6/2015 | |
| CN | 105906762 A | 8/2016 | |
| CN | 109307966 A | 2/2019 | |
| CN | 109897644 A | 6/2019 | |
| CN | 110092875 A | 8/2019 | |
| CN | 110229677 A | 9/2019 | |
| CN | 110256810 A | 9/2019 | |
| CN | 110862829 A | 3/2020 | |
| EP | 0452460 A1 | 10/1991 | |
| JP | H047518 A | 1/1992 | |
| JP | 2002275471 A | 9/2002 | |
| JP | 2018180536 A | 11/2018 | |
| KR | 20000036176 A * | 6/2000 | ....... G01N 33/54313 |
| WO | WO-2014077357 A1 * | 5/2014 | .......... H10K 85/344 |
| WO | 2018009174 A1 | 1/2018 | |

OTHER PUBLICATIONS

Mrukiewicz et al., "Threshold voltage decrease in a thermotropic nematic liquid crystal doped with graphene oxide flakes," Beilstein Journal of Nanotechnology, 2019, 10, Jan. 7, 2019, 8 pages.

Israel Patent Office, International Search Report and Written Opinion received in International Application No. PCT/IL2023/051303, Mar. 13, 2024, 12 pages.

Zhang et al., "The physical properties of alkene-terminated liquid crystalmolecules/E8 mixture and the electro-optical properties as they doped in polymer-dispersedliquid crystal systems," Liquid Crystals, 45:8, Dec. 7, 2017, 12 pages.

* cited by examiner

100

102
104
106
108
110
112
114
116
118

108

400

<u>500</u>

510 — MIX WATER, SURFACTANTS, AND DE-FOAMER

520 — MIX LIQUID CRYSTALS AND ALKANE MOLECULES

530 — MIX HYDROPHILIC POLYMER TO OBTAIN EMULSION

540 — DEGAS EMULSION

550 — COAT EMULSION ONTO SUBSTRATE

560 — DRY EMULSION

PARAFFINIC COMPOUND ADDITION TO LIQUID CRYSTALS FOR REDUCED SWITCHING VOLTAGE ON NCAP-BASED ELECTRO-OPTICAL MODULATOR

TECHNICAL FIELD

The present invention generally relates to electro-optics, and more particularly to liquid crystal materials for use in electro-optic applications.

BACKGROUND

Electro-optic modulators using liquid crystals, particularly nematic curvilinear aligned phases (NCAP) films or polymer dispersed liquid crystal (PDLC) films, for modulation are used to test conduction of thin-film transistors and interconnects of flat panel displays (FPD) under fabrication. Defoaming agents may be added to the formulation of the electro-optic modulators. Adjustment of the loading level of the defoaming agents may be used to control the bias the electro-optic modulator to maintain the bias in a specified range. The amount of the defoaming agent may be selected to control the threshold voltage of the electro-optic modulators. The defoaming agents comprise a mixture of hydrophobic silica and various dispersing agents. Undesirably, the defoaming agents have large batch-to-batch variation in the composition affecting defectivity, yield, and performance. Therefore, it would be advantageous to provide a device, system, and method that cures the shortcomings described above.

SUMMARY

A modulator material layer is disclosed, in accordance with one or more embodiments of the present disclosure. The modulator material layer comprises a polymer matrix formed of a plurality of cross-linked polymer molecules. The modulator material layer comprises a plurality of droplets of liquid crystals within the polymer matrix. The modulator material layer comprises a plurality of alkane molecules dispersed within the plurality of droplets of liquid crystals. The plurality of alkane molecules are soluble in the plurality of droplets of liquid crystals.

In some embodiments, the plurality of alkane molecules comprise at least one of acyclic branched hydrocarbons or acyclic unbranched hydrocarbons. The acyclic branched hydrocarbons or the acyclic unbranched hydrocarbons have a formula $C_nH_{2n+2}$; where n is an integer.

In some embodiments, the plurality of alkane molecules comprise between nine and sixteen carbon atoms.

In some embodiments, the plurality of alkane molecules comprise the acyclic unbranched hydrocarbons. The plurality of alkane molecules comprise at least one of n-nonane, n-decane, n-undecane, n-dodecane, n-tridecane, n-tetradecane, n-pentadecane, or n-hexadecane.

In some embodiments, the plurality of alkane molecules comprise the acyclic branched hydrocarbons.

In some embodiments, the modulator material layer includes between 5% and 30% by weight of the plurality of alkane molecules relative to the liquid crystals.

In some embodiments, the modulator material layer includes between 5% and 15% by weight of the plurality of alkane molecules relative to the liquid crystals.

In some embodiments, the plurality of alkane molecules comprise alkyl cyclic hydrocarbons. The cyclic hydrocarbons have a formula $C_nH_{2(n+1-r)}$, where n and r are each integers, where n is a number of carbon atoms and r is the number of rings.

In some embodiments, the modulator material layers comprises a plurality of unsaturated hydrocarbon compounds dispersed within the plurality of droplets of liquid crystals. The plurality of unsaturated hydrocarbon compounds are soluble in the plurality of droplets of liquid crystals.

In some embodiments, the plurality of unsaturated hydrocarbon compounds comprise at least one of alkenes and alkynes.

In some embodiments, the modulator material layer comprises mineral oil. The mineral oil comprises a composition of the plurality of alkane molecules and a plurality of unsaturated hydrocarbon compounds. The plurality of alkane molecules comprise at least one of acyclic branched hydrocarbons or acyclic unbranched hydrocarbons. The plurality of alkane molecules comprise alkyl cyclic hydrocarbons. The plurality of unsaturated hydrocarbon compounds comprise at least one of alkenes or alkynes; where the plurality of alkane molecules comprise at least one alkylated aromatic molecule.

In some embodiments, the modulator material layer is a nematic curvilinear aligned phase (NCAP) film.

In some embodiments, the modulator material layer is a polymer dispersed liquid crystal (PDLC) film.

In some embodiments, the droplets range in size between 0.1 and 10 microns.

In some embodiments, the plurality of alkane molecules are insoluble in the polymer matrix.

In some embodiments, the liquid crystals are randomly oriented within the plurality of droplets while no electric field is present. The liquid crystals at least partially align along a direction of an electric field while the electric field is applied across the modulator material layer.

An electro-optic modulator is disclosed in accordance with one or more embodiments of the present disclosure. The electro-optic modulator comprises a transparent conductive film. The electro-optic modulator comprises a modulator material layer disposed on the transparent conductive film. The modulator material layer comprises a polymer matrix formed of a plurality of cross-linked polymer molecules. The modulator material layer comprises a plurality of droplets of liquid crystals within the polymer matrix. The modulator material layer comprises a plurality of alkane molecules dispersed within the plurality of droplets of liquid crystals. The plurality of alkane molecules are soluble in the plurality of droplets of liquid crystals.

In some embodiments, the liquid crystals and the plurality of alkane molecules are randomly oriented within the plurality of droplets while no electric field is present. The liquid crystals at least partially align along a direction of an electric field while the electric field is applied across the modulator material layer. The transparent conductive film generates the electric field.

In some embodiments, the electro-optic modulator comprises a glass substrate. The modulator material layer is one of a direct coating onto the glass substrate or a lamination onto the glass substrate.

In some embodiments, the plurality of alkane molecules are at least one of acyclic branched hydrocarbons or acyclic unbranched hydrocarbons. The plurality of alkane molecules have a formula $C_nH_{2n+2}$; where n is an integer.

In some embodiments, the plurality of alkane molecules comprise between nine and sixteen carbon atoms.

In some embodiments, the modulator material layer includes between 5% and 30% by weight of the plurality of alkane molecules relative to the liquid crystals.

In some embodiments, the plurality of alkane molecules comprise alkyl cyclic hydrocarbons. The cyclic hydrocarbons have a formula $C_nH_{2(n+1-r)}$, where n and r are each integers, where n is a number of carbon atoms and r is the number of rings.

In some embodiments, the modulator material layer comprises a plurality of unsaturated hydrocarbon compounds dispersed within the plurality of droplets of liquid crystals. The plurality of unsaturated hydrocarbon compounds are soluble in the plurality of droplets of liquid crystals.

In some embodiments, the plurality of unsaturated hydrocarbon compounds comprise at least one of alkenes and alkynes.

In some embodiments, the modulator material layer comprises mineral oil. The mineral oil comprises a composition of the plurality of alkane molecules and a plurality of unsaturated hydrocarbon compounds. The plurality of alkane molecules comprise at least one of acyclic branched hydrocarbons or acyclic unbranched hydrocarbons. The plurality of alkane molecules comprise alkyl cyclic hydrocarbons. The plurality of alkane molecules comprise alkylated aromatic molecules. The plurality of unsaturated hydrocarbon compounds comprise at least one of alkenes or alkynes.

An imaging system is disclosed, in accordance with one or more embodiments of the present disclosure. The imaging system comprises an illumination source configured to generate illumination. The imaging system comprises a stage for a sample. The imaging system comprises a detector to generate an image of at least a portion of the sample. The imaging system comprises an electro-optic modulator disposed in a path of the illumination from the illumination source and separated from the sample by an air gap. The electro-optic modulator comprises a transparent conductive film. The electro-optic modulator comprises a modulator material layer disposed on the transparent conductive film. The modulator material layer comprises a polymer matrix formed of a plurality of cross-linked polymer molecules. The modulator material layer comprises a plurality of droplets of liquid crystals within the polymer matrix. The modulator material layer comprises a plurality of alkane molecules dispersed within the plurality of droplets of liquid crystals. The plurality of alkane molecules are soluble in the plurality of droplets of liquid crystals.

In some embodiments, the liquid crystals are randomly oriented within the plurality of droplets while no electric field is present. The liquid crystals at least partially align along a direction of an electric field while the electric field is applied across the modulator material layer. The transparent conductive film generates the electric field by capacitively coupling to the sample.

A method is disclosed, in accordance with one or more embodiments of the present disclosure. The method includes obtaining an emulsion by mixing water, liquid crystals, a plurality of alkane molecules, and a plurality of hydrophilic polymer molecules. The method includes coating the emulsion onto a substrate. The method includes drying the emulsion. The emulsion forms a modulator material layer. The modulator material layer comprises a polymer matrix formed by cross-linking the plurality of hydrophilic polymer molecules. The modulator material layer comprises a plurality of droplets of the liquid crystals within the polymer matrix. The modulator material layer comprises the plurality of alkane molecules dispersed within the plurality of droplets of liquid crystals. The plurality of alkane molecules are soluble in the plurality of droplets of liquid crystals.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

In an effort to compensate for bias adjustments and reduce defoamer amounts, different paraffinic compound additions are explored.

Embodiments of the present disclosure are generally directed to the addition of alkanes to formulations of electro-optic modulators. In particular, the n-alkanes, branched alkanes, alkyl cyclic hydrocarbons, and alkylated aromatic compounds and their mixtures added to liquid crystal droplets of the electro-optic modulators. The n-alkanes additives reduce the switching voltage of the liquid crystals. In particular, these n-alkanes additives reduce the switching voltage of nematic curvilinear aligned phase (NCAP) based and/or polymer dispersed liquid crystal (PDLC) based electro-optical modulators. The type and weight of the alkane is selected to achieve the desired switching voltage.

The electro-optic modulator may be a component of an imaging system, also referred to as an automated optical inspection (AOI) system, a voltage imaging optical system (VIOS), an array checker, and the like. By reducing the turn-on voltage, process improvements of the optical inspection may similarly be improved.

A method of manufacturing the electro-optic modulator is also described. Embodiments of the electro-optic modulator with a lamination process include first coating a plastic sheet (such as Mylar) having transparent conductive layer with either NCAP or PDLC including n-alkane, branched alkanes, alkyl cyclic, alkylated aromatic molecules or their mixtures in the formulation. A second layer of plastic sheet is added (with or without conductive layer). This sandwiched structure is then laminated on the glass substrate by using optical adhesive. The top plastic sheet of the LC/polymer sandwich is then peeled off and discarded. A dielectric mirror film (or pellicle) is formed on plastic sheet, and then added to the assembly stack.

U.S. Pat. No. 7,817,333, titled "Modulator with improved sensitivity and life time", filed on Feb. 6, 2007; U.S. Pat. No. 8,801,964, titled "Encapsulated polymer network liquid crystal material, device and applications", filed on Dec. 22, 2010; U.S. Pat. No. 7,639,319, titled "Polymer dispersed liquid crystal formulations for modulator fabrication", filed on Apr. 7, 2005; are each incorporated herein by reference in the entirety.

Figure 1:
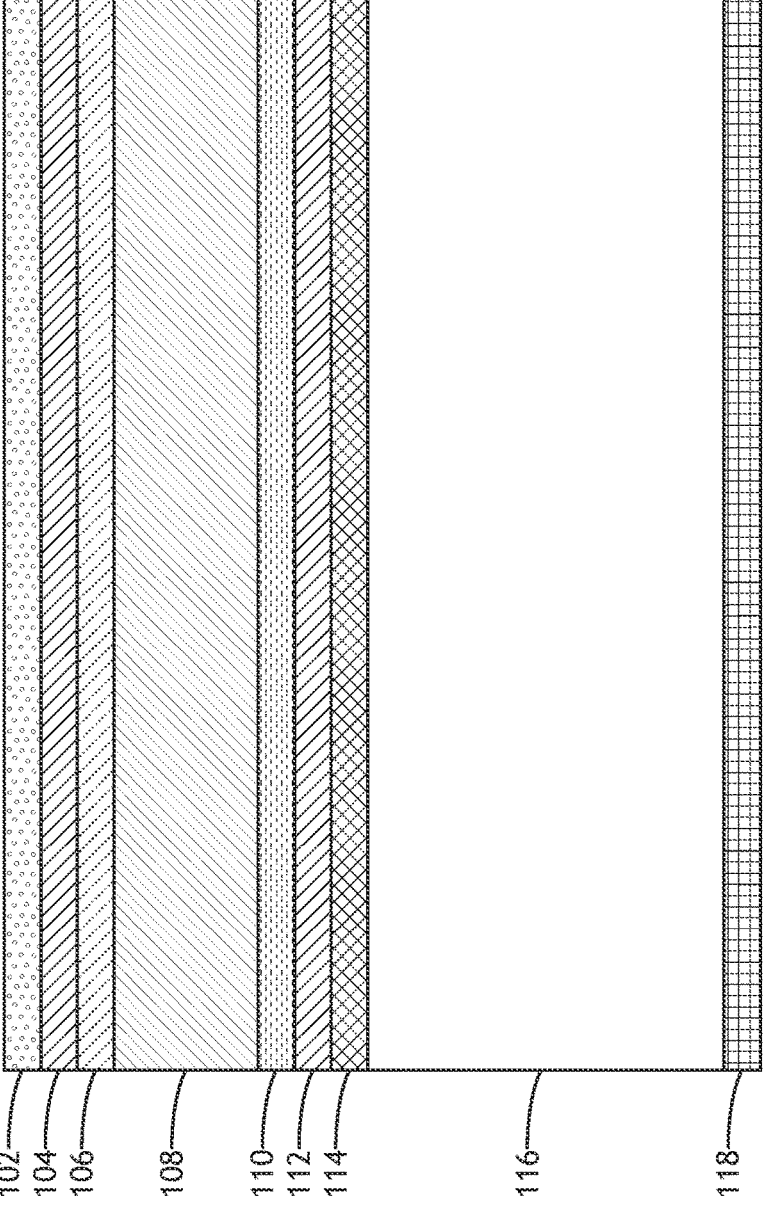
FIG. 1 illustrates a cross-section view of an electro-optic modulator, in accordance with one or more embodiments of the present disclosure.

FIG. 1 is a cross-section view of an electro-optic modulator 100, in accordance with one or more embodiments of the present disclosure. The electro-optic modulator 100 may include one or more films, layers, or coatings. The one or more film layers selectively permit the transmissivity of light. For example, the electro-optic modulator 100 may include one or more of a hard coating layer 102, plastic film 104, dielectric mirror film 106, modulator material layer 108, transparent conductive layer 110, plastic film 112, optical adhesive 114, glass substrate 116, and/or anti-reflective coating 118. It is further contemplated that the electro-optic modulator 100 is not intended to be limited to the films, layers, or coatings described above.

The modulator material layer 108 (also referred to as a sensor layer, liquid crystal layer, polymer matrix layer, and the like) may be applied onto the glass substrate 116 by a number of methods, such as, but not limited to, by direct coating or lamination. Embodiments made with a lamination process include first coating the plastic film 112 (e.g., polyethylene terephthalate (PET), also known as Mylar) having the transparent conductive layer 110 with the modulator material layer. The transparent conductive layer 110 may generally include any material which is optically transparent and conductive to act as an electrode, such as, but not limited to, indium tin oxide (ITO) or other conductive material. The modulator material layer 108 may include an NCAP mixture or a PDLC mixture. The plastic film 112, and similarly the transparent conductive layer 110 and the modulator material layer 108, may be laminated on the glass substrate 116 by the optical adhesive 114. The dielectric mirror film 106 (or pellicle) may be formed on the plastic film 104, and then added to the modulator material layer 108 of the assembly stack. In embodiments, a vacuum assisted attachment process is used. The anti-reflective coating 118 may be applied to the bottom surface of a glass substrate 116. Similarly, the hard coating layer 102 may be cured to the plastic film 104. The hard coating layer 102 may include a major hard coating and a thinner slip agent layer.

Light transmission through the modulator material layer 108 may change in accordance with a magnitude of an electric field applied to the liquid crystal droplets of the modulator material layer 108. The transparent conductive layer 110 may capacitively couple with a sample to induce a localized voltage and similarly an electric field. The localized voltage may generate the electric field. The electric field causes the liquid crystals in the modulator material layer 108 to align in the direction of the electric field.

Figure 2:
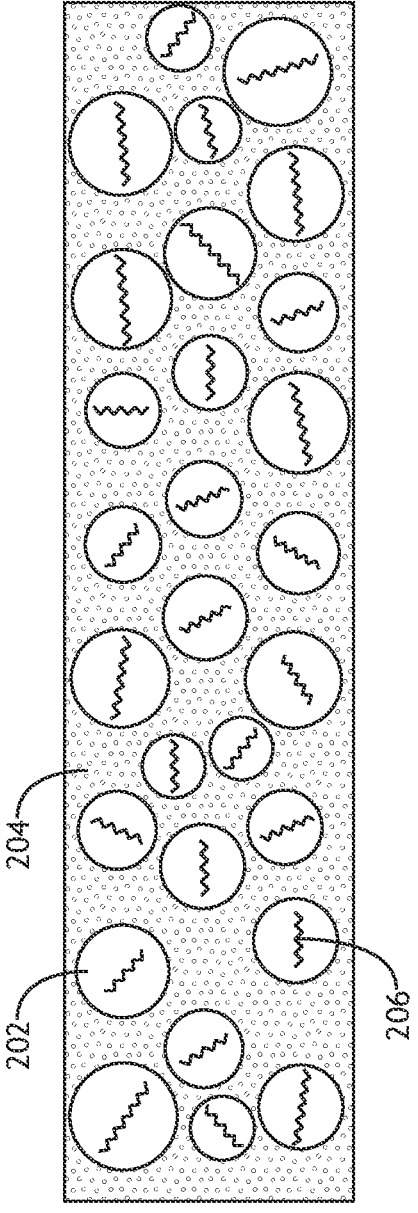
FIG. 2 illustrates a view of a modulator material layer of an electro-optic modulator, the NCAP material layer including droplets of liquid crystal with n-alkanes dispersed inside the droplets, in accordance with one or more embodiments of the present disclosure.

FIG. 2 is a cross-section view of the modulator material layer 108, in accordance with one or more embodiments of the present disclosure. The modulator material layer 108 includes droplets 202 of liquid crystals suspended in a polymer matrix 204. The modulator material layer 108 include a diluent of one or more materials, such as, alkane 206 molecules and/or unsaturated hydrocarbon compound dispersed within the droplets 202. The alkanes 206 may include n-alkane, branched alkane, and/or cyclic alkane as will be described further herein.

The modulator material layer 108 includes the droplets 202. The droplets 202 each include several liquid crystal molecules. The molecules have a temperature transition where there are in the liquid crystal phase. In some embodiments, the droplets 202 are from about one to five microns in size. The liquid crystal droplets may include a liquid crystal temperature range. The liquid crystal temperature range refers to the temperature at which the liquid crystal is in a liquid crystal phase (e.g., between the crystal phase and the liquid phase).

The droplets 202 of liquid crystal may include any liquid crystal material. For example, the liquid crystal may include, but is not limited to, one or more of a nematic liquid crystal, a ferroelectric liquid crystal, a Blue Phase liquid crystal, a mixture of liquid crystal and dichroic dye, a cholesteric liquid crystal, and the like. The liquid crystal material can be substantially hydrophobic such that droplets 202 of the liquid crystal material can be formed with the emulsion, and such that the prepolymer and photo-initiator can be substantially dissolved in the liquid crystal droplets when creating PDLC devices. The prepolymer and photo-initiator can be substantially hydrophobic, such that the liquid crystal droplets of the emulsion comprise most of the photo-initiator and prepolymer mixture.

The modulator material layer 108 also includes the polymer matrix 204. The polymer matrix 204 may include any polymer matrix material. For example, the polymer matrix material may include, but is not limited to, one or more water-based polymers, such as poly vinyl alcohol (PVA) a urethane (e.g., polyurethane), an acrylate (e.g., polyacrylate, fluorinated acrylate, silicone acrylate), or a water-based latex. Surface-activation agents used to formulate the polymer matrix 204.

The amount of polymer matrix 204 material may correspond to the strength and rigidity of the sensor material. The weight ratio of liquid crystal material to polymer matrix material can be within a range from about 50/50 to about 80/20, for example. The increased amount of polymer matrix 204 material can increase the strength of the sensor material and the operating voltage.

The polymer matrix 204 is located around the droplets 202 and contains the droplets 202 with the polymer matrix 204. The droplets 202 are then dispersed within the polymer matrix 204. The droplets 202, with liquid crystal molecules may anchor to the polymer matrix 204. In many embodiments, the degree of anchoring depends on the chemistry of the liquid crystal molecule and polymer matrix 204.

The liquid crystal molecules may be randomly oriented within the droplet 202 while no electric field is present. The liquid crystals may at least partially align along the electric field direction while the electric field is applied across the modulator material layer 108. For such alignment to occur, the molecules overcome the anchoring and/or friction with the polymer matrix 204 at the attachment locus. The orientation of the liquid crystals then changes the transmissivity of the modulator material layer 108. For example, the modulator material layer 108 may be opaque when no voltage is applied and the liquid crystals are randomly oriented. The modulator material layer 108 may be transparent or translucent when voltage is applied, and the liquid crystal molecules at least partially align. The liquid crystals then return to the random orientation when the electric field is removed.

The liquid crystal droplets may include a switching voltage. An intrinsic switching voltage of the liquid crystals may correspond to a voltage across the modulator material layer at which light transmission through electro-optic modulator has a maximum sensitivity to changes in the voltage. In many embodiments, the switching voltage corresponds to the electric field strength at which about half of the liquid crystal molecules are substantially aligned with the electric field. For best sensitivity, the goal is to invoke the largest change in transmission for the smallest voltage change possible. The sensitivity can be improved by reducing the intrinsic switching voltage of the liquid crystal material. The operating voltage and sensitivity of liquid crystal materials may be related to one or more factors, such as, but not limited to, properties of the liquid crystal, properties of the polymer matrix, a liquid crystal droplet size distribution in the polymer matrix, and/or interface properties between the polymer matrix the liquid crystal.

Anchoring of the liquid crystal molecules to the polymer matrix 204 can increase the intrinsic operating voltage of the modulator material layer 108. Frictional forces can comprise anchoring forces that may be associated with static friction of the LC molecules to the polymer matrix and may also comprise dynamic friction associated with relative motion between the liquid crystal molecules and the polymer matrix. As friction may affect the speed at which molecules move in relation to the surrounding polymer matrix, decreased friction may increase the switching speed of the liquid crystal molecules. As an increase in voltage may be required to overcome anchoring of the liquid crystal molecules to the polymer matrix, increased anchoring may be related to an increased intrinsic operating voltage of the modulator material layer 108. Thus, the lower the frictional force and/or anchoring, between the droplets 202 of liquid crystal and the polymer matrix 204, the lower the driving voltage required to switch the liquid crystal molecules and/or liquid crystals from a substantially unaligned condition to a condition substantially aligned with the electric field.

A diluent is added to the droplets 202 of liquid crystal. The diluent can be alkane 206 molecules and/or unsaturated hydrocarbon compounds. The alkanes 206 may include any of an n-alkane, a branched alkane, a cyclic alkane, or a mixture thereof. As depicted, the alkanes 206 are n-alkanes although this is not intended to be limiting. The alkanes 206 and/or unsaturated hydrocarbon compounds reduce the switching voltage of the liquid crystal. In some embodiments, the alkanes 206 and/or unsaturated hydrocarbon compounds are soluble in the droplets 202 of liquid crystal. By being soluble in the droplets 202 of liquid crystal, the alkanes 206 and/or unsaturated hydrocarbon compounds affect the order in the liquid crystal molecules or impact the anchoring or frictional force between the polymer matrix 204 and the droplets 202 of liquid crystal. For example, the anchoring and/or friction between the droplets 202 of liquid crystals and the polymer matrix 204 is reduced by the alkanes 206 and/or unsaturated hydrocarbon compounds, and thus alignment orientation and switching speed of the liquid crystal molecules when an-electric field is applied happens faster and at lower drive voltages.

The amount of the alkanes 206 molecules and/or unsaturated hydrocarbon compounds may be selected based on one or more considerations. The amount of the alkanes 206 molecules and/or unsaturated hydrocarbon compounds may be selected to achieve a desired reduction in switching voltage and maintain a desired liquid crystal temperature range. Increasing the amount of the alkanes 206 and/or unsaturated hydrocarbon compounds may both desirably reduce the switching voltage and undesirably reduce the liquid crystal temperature range. For example, it is desirable to maintain the liquid crystal temperature range to be at least between −20° C. up to 100° C. or higher such that the molecules remain in the liquid crystal phase at typical operating temperature. Too much additions of the alkane 206 molecules and/or unsaturated hydrocarbon compounds may cause the absence of a liquid crystal phase transition or range. In some embodiments, the modulator material layer 108 may include between 5% and 30% by weight of the alkanes 206 and/or unsaturated hydrocarbon compounds relative to the liquid crystal. It is contemplated that increasing the weight percentage of the alkanes 206 and/or unsaturated hydrocarbon compounds much beyond 30% may cause the droplets 202 of liquid crystal to no longer be in the liquid crystal range temperature to decrease or be absent. In some embodiments, the modulator material layer 108 includes between 5% and 15% by weight of the alkanes 206 and/or unsaturated hydrocarbon compounds relative to the liquid crystal. The 5 to 15% range is selected to achieve a desired reduction in the switching voltage.

A number of alkanes 206 are described herein. Any of the alkanes 206 may be added to the droplets 202. As defined by the IUPAC, alkanes "are acyclic branched or unbranched hydrocarbons having the general formula $C_nH_{2n+2}$, therefore consisting entirely of hydrogen atoms and saturated carbon atoms." Here "n" is an integer. The hydrogen and carbon atoms arranged in a tree structure in which all the carbon-carbon bonds are single bonds. Although the alkanes are described as being acyclic branched or unbranched hydrocarbons, this is not intended as a limitation of the present disclosure. It is further contemplated that the alkanes 206 may include any of n-alkanes, branched, cyclic, aromatic alkylated, or alkane mixtures thereof. The alkanes 206 may also be referred to as a paraffin, although this is not intended to be limiting. The alkanes 206 are saturated hydrocarbons such that the hydrocarbon has only single bonds.

In some embodiments, the alkanes 206 may refer to acyclic saturated hydrocarbons with the formula $C_nH_{2n+2}$. The acyclic saturated hydrocarbons include methane, ethane, propane, butane, pentane, hexane, heptane, octane, nonane, decane, undecane, dodecane, tridecane, tetradecane, pentadecane, hexadecane, or an alkane with a higher number of carbon atoms. The alkanes 206 may be any of the isomers (e.g., unbranched isomers or branched isomers) of the alkanes 206.

The alkanes 206 may include the unbranched isomer or normal (e.g., n-"root"ane) alkane. For example, the unbranched isomer or normal alkane may include n-pentane, n-hexane, n-heptane, n-octane, n-nonane, n-decane, n-undecane, n-dodecane, n-tridecane, n-tetradecane, n-pentadecane, n-hexadecane, or normal alkanes with a higher number of carbon atoms.

The alkanes 206 may also include the branched isomers of the alkanes. The branched isomer alkanes may be an isomer of any of butane, pentane, hexane, heptane, octane, nonane, decane, undecane, dodecane, tridecane, tetradecane, or an alkane with a higher number of carbon atoms.

Although much of the present disclosure is directed to linear alkanes, this is not intended as a limitation of the present disclosure. It is further contemplated that the alkanes 206 may include one or more cycloalkanes. The cycloalkanes may also be referred to as saturated cyclic alkanes and/or naphthene. The cycloalkanes may refer to any mono-cyclic saturated hydrocarbons with the formula $C_nH_{2(n+1−r)}$, where n and r are each integers, where n is a number of carbon atoms and r is the number of rings. In some embodiments, the cycloalkanes include only one ring such that the cycloalkanes include the formula $C_nH_{2n}$. In some embodiments, the cycloalkanes are derivatives of cyclohexane or naphthenic oil. For example, the cycloalkanes may be a cyclohexane-containing alkane. In some embodiments, the alkanes 206 may include aromatics. The aromatics are alkylated compounds containing benzene or naphthalene groups.

Any of the various alkanes 206 described may be added to the droplets 202. It is contemplated that the alkanes 206 may be selected based on one or more considerations. Considerations for selecting the alkane 206 include at least the boiling point and melting point of the alkane 206.

One consideration in selecting the alkane 206 is the boiling point of the alkane 206. The boiling point of the alkane 206 may impact both the rate of evaporation of the alkane 206 during baking and the phase of the liquid crystal droplets. For example, the boiling point may generally be inversely proportional to the evaporation rate. A portion of the alkane 206 may evaporate during baking of the modulator material layer 108. Alkanes 206 with lower numbers of carbon (e.g., octane or below) may evaporate particularly quickly. "Higher molecular weight alkanes" with at least nine carbons (e.g., nonane or above) include sufficiently high boiling points at which the alkanes 206 will not rapidly evaporate during baking. Therefore, it is contemplated that the alkane 206 may include "higher molecular weight alkanes" with at least nine carbons.

Another consideration in selecting the alkane 206 is the melting point of the alkane. The melting point of the alkane 206 may impact the phase of the alkanes 206 in the droplets 202 of liquid crystal. For example, the modulator material layer 108 may operate at room temperature (e.g., 25° C.). Alkanes 206 with a melting point at or above room temperature may cause the alkane 206 to transition to a solid within the droplets 202. The phase transition of the alkanes 206 may negatively impact the transmissivity and/or the switching voltage. Therefore, it is contemplated that alkanes with melting points below room temperature may be selected for the alkane 206. In this regard, it is desirable that the alkanes 206 are a liquid at room temperature. For example, the alkane 206 may include alkanes with between nine and sixteen carbons (e.g., nonane, decane, undecane, dodecane, tridecane, tetradecane, pentadecane, or hexadecane) or an isomer thereof. Alkanes with between nine and sixteen carbons include the melting points below room temperature. Alkanes with seventeen and more carbons may generally be solids at standard conditions and may be excluded from selection. Although the melting point of the alkane 206 has been described as one consideration in selecting the alkane 206, this is not intended as a limitation of the present disclosure. Even where the alkane is a solid, the mixture of liquid crystal and alkane may still be in the liquid crystal phase. As long as the mixture of the liquid crystal and the alkane additive are in the liquid crystal phase range at the desired temperature, then the modulator material layer 108 is electro-optically active.

Nonane includes 35 isomers. Decane includes 75 isomers. Undecane includes 159 isomers. Dodecane includes 355 isomers. Tridecane includes 802 isomers. Tetradecane includes 1,858 isomers. Pentadecane includes 4,347 isomers. Hexadecanes includes 10,359 isomers. The isomers of nonane, decane, undecane, dodecane, tridecane, tetradecane, pentadecane, and hexadecane are incorporated herein by reference. The alkane 206 may include any of the isomers of nonane, decane, undecane, dodecane, tridecane, tetradecane, pentadecane, and hexadecane.

In the example depicted, the droplets 202 each include a single straight chain alkane (i.e., n-alkanes). This depiction is not intended to be limiting and is merely illustrative. The droplets 202 may generally include any number of the alkanes 206 which may include any numbers of carbon, and which may be straight or branched isomer alkanes, and which may include one or more cyclic groups.

In some embodiments, the alkanes 206 are soluble or miscible with the droplets 202 of liquid crystal. The alkanes 206 may then be disposed within the droplets 202. The alkane 206 may or may not be soluble in the polymer matrix 204. For example, the alkanes 206 may include limited solubility in the polymer matrix 204 as compared to the solubility in the droplets 202. The alkanes 206 then prefer to stay within the droplets 202 of liquid crystal.

Although much of the present disclosure is described in the context of the alkanes being disposed in the droplets 202, this is not intended as a limitation of the present disclosure. It is further contemplated that a number of additional molecules may be disposed in the droplets 202 of liquid crystal. For example, unsaturated hydrocarbon compounds may be disposed in the droplets 202 of liquid crystal. The unsaturated hydrocarbon compounds may include hydrocarbons that include one or more double or triple covalent bonds between adjacent carbon atoms. It is contemplated that the unsaturated hydrocarbon compounds may include straight chain unsaturated hydrocarbons, such as alkenes and alkynes. The alkenes may include acyclic alkenes with the formula $C_nH_{2n}$. The alkynes may include acyclic alkynes with a formula $C_nH_{2n-2}$. It is further contemplated that the unsaturated hydrocarbon compounds may include branched chain unsaturated hydrocarbons, such as unsaturated alkyl cyclic hydrocarbons. The unsaturated cyclic hydrocarbons may include cyclic alkenes and/or cyclic alkynes. Alkyl cyclic hydrocarbons may refer to cyclic hydrocarbons with an alkyl tail linked to a cyclic group.

In some embodiments, the droplets 202 may include a composition of multiple isomers of the alkanes, alkanes with different numbers of carbon, the unsaturated hydrocarbon compounds, and the like. In some embodiments, the alkanes 206 and the unsaturated hydrocarbon compounds are in the form of mineral oil. The modulator material layer 108 may include the mineral oil. The mineral oil may include a composition of various hydrocarbon compounds, such as multiple of the alkanes 206 and the unsaturated hydrocarbon compounds. For example, the mineral oil may include a composition of one or more isomers of nonane, decane, undecane, dodecane, tridecane, tetradecane, pentadecane, and/or hexadecane. The mineral oil may also include any of cyclo-hexanes. In some embodiments, the alkanes 206 are derivatives of the mineral oil. The mineral oil may also include one or more of the unsaturated hydrocarbon compounds. The mineral oil may also include one or more aromatics. The mineral oil may also include one or more Asphaltics. It is contemplated that any of the various hydrocarbon compounds in the mineral oil may include a carbon number ranging from nine to fifty, or more. Similarly, the modulator material layer 108 may include any of the various weight of mineral oil relative to the liquid crystal, as described previously herein in the context of the weight of the alkane 206 and/or unsaturated hydrocarbon compounds relative to the liquid crystal.

As described further herein, driving voltages can be significantly reduced by adding paraffinic derivatives into the modulator material formulation.

Figure 3:
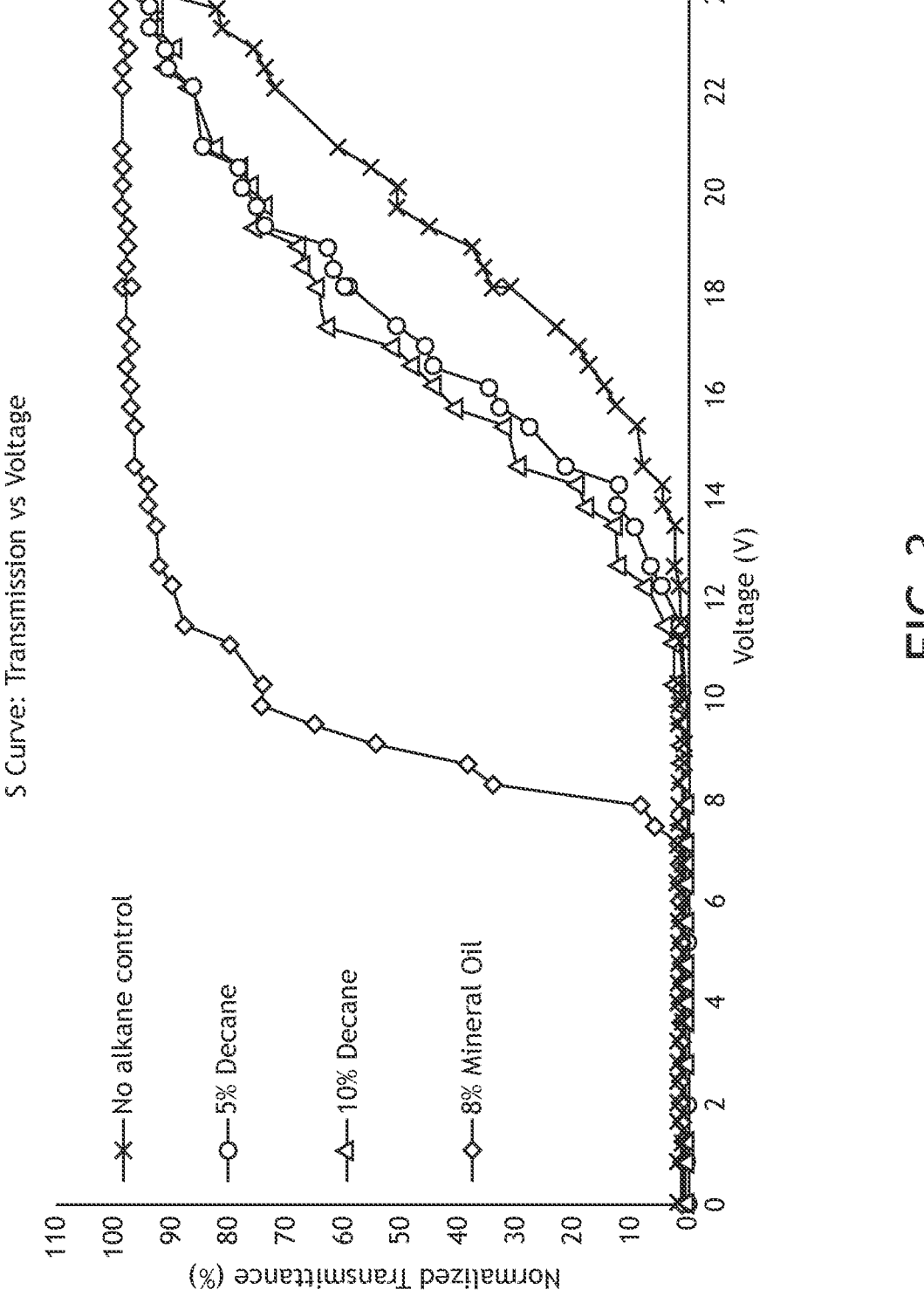
FIG. 3 illustrates a plot of a voltage transmission (V-T) diagram for an electro-optic modulator, in accordance with one or more embodiments of the present disclosure.

FIG. 3 illustrates a graph 300 including experimental results, in accordance with one or more embodiments of the present disclosure. In this example, four NCAP samples were analyzed. NCAP samples were made with liquid crystal containing 0% of any alkane (control), 5% n-decane, 10% n-decane and 8% mineral oil by weight relative to the liquid crystal. Each of the NCAPs were made using the same liquid crystal and lot surfactant mixture.

The addition of alkane as a diluent in the droplets 202 of liquid crystal is demonstrated to reduce the switching voltage of the liquid crystal in NCAP as compared to control NCAP without the addition of the alkane compounds. The Bias voltage was used to characterize the switching voltage of the NCAP. The 5 weight percent (wt %) n-decane addition into liquid crystal experienced a reduced switching voltage (light transmission, T % change from around 0% to over 90%) by about 3 V at 50% of relative light transmission of the laser beam relative to the control. The 8% mineral oil addition lowered the switching voltage of the liquid crystal by as much as about 11 V at 50% of relative light transmission of the laser beam relative to the control.

The slope of the curve is affected by the droplet size distribution and the interface properties between the polymer matrix 204 and droplets 202 of liquid crystal. A steeper slope can result if the droplets 202 are of uniform size and if the liquid crystals within the droplet 202 can move and/or switch easily relative to the polymer matrix 204. The voltage shift of the curve shown can be affected by the interface properties between the polymer matrix 204 and droplets 202 of liquid crystal. The curve may shift to lower voltage if the liquid crystal can move and/or switch easily relative to the polymer matrix 204. It is contemplated that the alkanes 206 or other paraffinic molecules reduce the order on the liquid crystal domain droplet to make the T-V curve slope steeper and to shift the operating voltage of liquid crystal material to a lower range.

Figure 4:
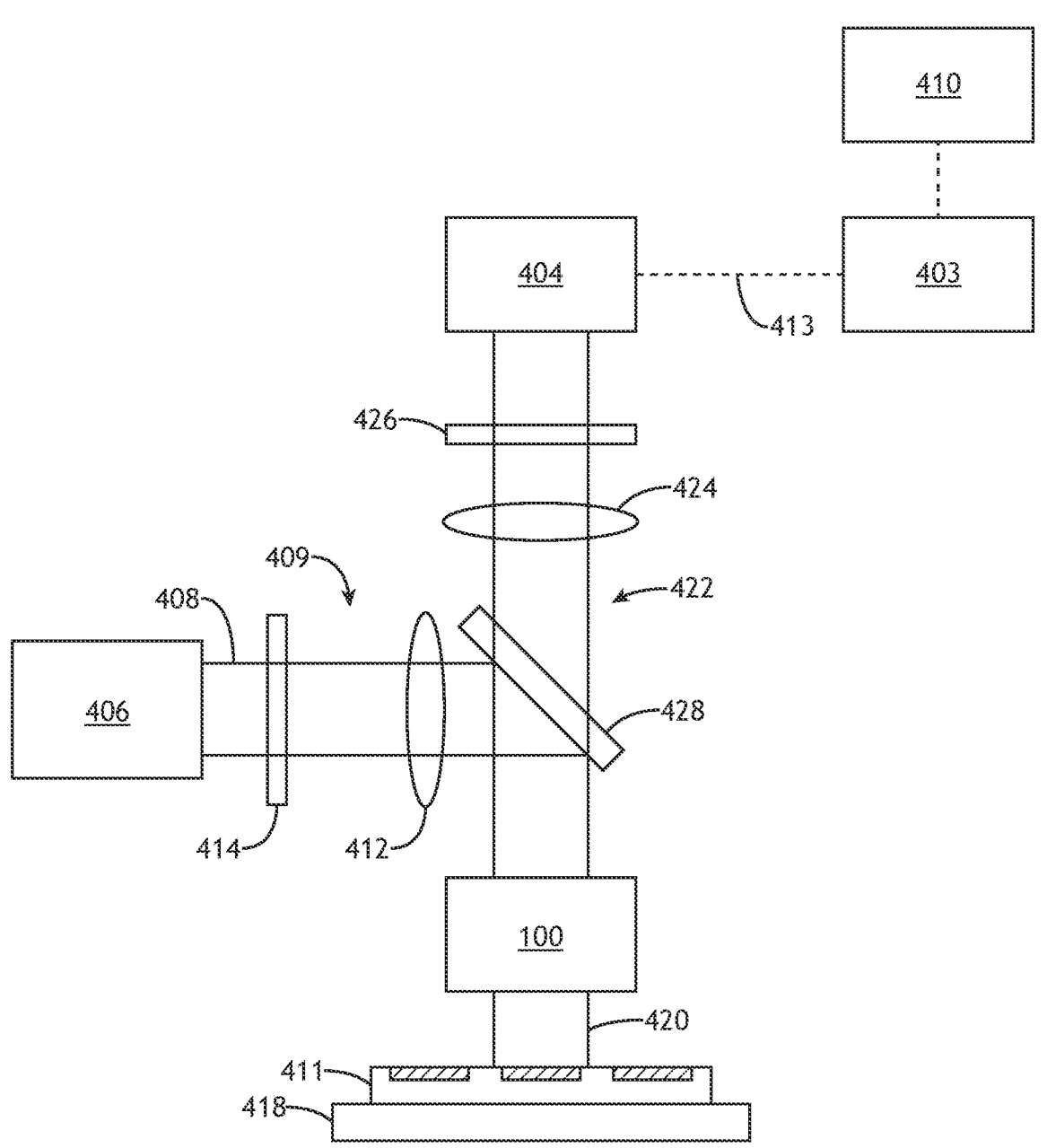
FIG. 4 illustrates a simplified view of an imaging system, in accordance with one or more embodiments of the present disclosure.

FIG. 4 is a conceptual view illustrating an imaging system 400, in accordance with one or more embodiments of the present disclosure. For the purposes of the present disclosure, the term 'imaging system' is interchangeable with the term 'imaging tool.' The imaging system 400 may generally include any type of imaging tool suitable, such as, but not limited to, voltage imaging. Voltage imaging may be employed to detect and measure defects in flat panel thin film transistors (TFT) arrays. The performance of the TFT array is simulated as if it were assembled into a TFT cell and then the characteristics of the TFT array are measured by indirectly measuring actual voltage distribution on the panel, or so-called voltage imaging, using an electro-optic modulator (e.g., electro-optic modulator 100). The voltage imaging may be performed by the imaging system 400. The imaging system 400 may include one or more components for checking such TFT arrays or other samples.

The electro-optic modulator 100 may be advantageous for a number of imaging tasks, such as to modulate a light source of the imaging system 400 to assist in detecting one or more defects of a sample 411, such as, but not limited to, thin film transistor (TFT) arrays, liquid crystal display (LCD) panels, OLED panels, and the like. The TFT arrays may be formed on a substrate, such as a clear plate of thin glass. The TFT arrays may include one or more printed layers. The printed layers may be formed on the substrate by a number of processes, such as, but not limited to, one or more material deposition steps, one or more lithography steps, one or more etching steps, and the like. The fabrication may occur in stages, where a material (e.g., indium tin oxide (ITO), etc.) is deposited over a previous layer or on the glass substrate, according to a process pattern. During fabrication, the printed layers are fabricated within selected tolerances to properly construct the final device. The printed layers may exhibit defects which are outside of the selected tolerances. Characteristics of the TFT array may be measured by the imaging system 400 to detect the defects.

In embodiments, the imaging system 400 includes an illumination source 406 to generate illumination 408. The illumination 408 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 406 may further generate illumination 408 including any range of selected wavelengths. In embodiments, the illumination source 406 may include a spectrally-tunable illumination source to generate illumination 408 having a tunable spectrum.

In embodiments, the illumination source 406 directs the illumination 408 to a sample 411 via an illumination pathway 409. The illumination pathway 409 may include one or more lenses 412 or additional illumination optical components 414 suitable for modifying and/or conditioning the illumination 408. For example, the one or more illumination optical components 414 may include, but are not limited to, one or more polarizers, one or more filters, one or more beam splitters, one or more diffusers, one or more homogenizers, one or more apodizers, one or more shapers, one or more shutters (e.g., mechanical shutters, electro-optical shutters, acousto-optical shutters, or the like), one or more aperture stops, and/or one or more field stops.

In embodiments, the imaging system 400 includes the electro-optic modulator 100. The electro-optic modulator 100 is disposed in a path of the illumination 408 from the illumination source 406. The electro-optic modulator 100 may modulate one or more characteristics of the illumination 408. During operation, light transmits through portions of the electro-optical modulator 100, and defects can be detected by observing changes in the reflected or transmitted light. The electro-optic modulator 100 is separated from the sample 411 by an air gap. The electro-optic modulator 100 may be placed a select number of microns (e.g., between 5-75 microns) above the surface of the sample 411 (e.g., the TFT array), and a voltage bias is applied across a transparent electrode of a layer of indium tin oxide (hereinafter "ITO") on a surface of the electro-optic modulator 100. Thereupon, the electro-optic modulator 100 capacitively couples to the sample 411 so that an electric field associated with the sample 411 is sensed by one or more layers of the electro-optic modulator 100 (e.g., a layer including liquid crystals). The intensity of incident light transmitted through the liquid crystals of the electro-optic modulator are varied, (i.e., modulated), based on the electric field strength felt by the liquid crystals. For example, in areas where a normal pixel is located, a localized voltage potential is impressed (e.g., a capacitive coupling between the sample 411 and the electro-optic modulator 100) causing one or more films of the electro-optical modulator 100 to be locally translucent. In the locally translucent regions, light from the light source 406 is allowed to pass through the electro-optical modulator 100 and reflect from the sample 411, for passing through to a collection pathway 422 (e.g., for capture by detector 404). By way of another example, in areas where no voltage potential is impressed (e.g., no capacitive coupling), one or more films of the electro-optical modulator 100 remains locally opaque. In the case where the electro-optical modulator 100 is locally opaque, light from light source 406 is scattered or otherwise prevented from passing through to the sample 411. Thus, a transmission-voltage (T-V) curve may be determined by applying the voltage. The intrinsic switching voltage of the electro-optic modulator 100 may correspond to the voltage across the electro-optic modulator 100 at which light transmission through the electro-optic modulator 100 has a maximum sensitivity to a change in voltage. For example, the switching voltage may correspond to the electric field strength at which a given percentage of liquid crystal molecules are substantially aligned with the electric field allowing for the light transmission.

In embodiments, the sample 411 includes a thin-film transistor (TFT) array. For example, the sample 411 may include pixel elements disposed between inactive regions. The sample stage 418 may include any device suitable for positioning the sample 411 within the imaging system 400.

In embodiments, a detector 404 is configured to capture radiation emanating from the sample 411 (e.g., sample light 420) through a collection pathway 422. For example, the collection pathway 422 may include, but is not required to include, the electro-optic modulator 100, a collection lens (e.g., an objective lens), or one or more additional collection pathway lenses 424. In this regard, a detector 404 may receive radiation reflected or scattered (e.g., via specular reflection, diffuse reflection, and the like) from the sample 411 or generated by the sample 411 (e.g., luminescence associated with absorption of the illumination 408, or the like).

The system 400 may include, but is not limited to, a controller 403. The controller 403 may include one or more processors and memory, and may include or be coupled to a user interface 410.

The collection pathway 422 may further include any number of collection optical components 426 to direct and/or modify illumination collected by the electro-optic modulator 100 including, but not limited to one or more collection pathway lenses 424, one or more filters, one or more polarizers, or one or more blocks. Additionally, the collection pathway 422 may include field stops to control the spatial extent of the sample imaged onto the detector 404 or aperture stops to control the angular extent of illumination from the sample used to generate an image on the detector 404. In another embodiment, the collection pathway 422 includes an aperture stop located in a plane conjugate to the back focal plane of an optical element to provide telecentric imaging of the sample. In embodiments, the imaging system 400 includes a beam splitter 428 oriented such that the electro-optic modulator 100 may simultaneously direct the illumination 408 to the sample 411 and collect radiation emanating from the sample 411.

The detector 404 may include any type of optical detector suitable for measuring illumination received from the sample 411. For example, the detector 404 may include, but is not limited to, a CCD detector, a TDI detector, a photomultiplier tube (PMT), an avalanche photodiode (APD), a complementary metal-oxide-semiconductor (CMOS) sensor, or the like. In another embodiment, the detector 404 may include a spectroscopic detector suitable for identifying wavelengths of light emanating from the sample 411.

In embodiments, the controller 403 is communicatively coupled to a detector 404. The controller 403 may include one or more processors configured to execute any of various process steps. In embodiments, the controller 403 is configured to generate and provide one or more control signals configured to perform one or more adjustments to one or more process tools based on image signals 413 from the detector 404.

The one or more processors of the controller 403 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the imaging system 400, as described throughout the present disclosure. Moreover, different subsystems of the system 400 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 403 may include one or more controllers housed in a common housing or within multiple housings. In this way, any controller or combination of controllers may be separately packaged as a module suitable for integration into imaging system 400. Further, the controller 403 may analyze data received from the detector 404 and feed the data to additional components within the imaging system 400 or external to the imaging system 400.

The memory medium may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors. In one embodiment, the memory medium may be located remotely with respect to the physical location of the one or more processors and controller. For instance, the one or more processors of controller 403 may access a remote memory (e.g., server), accessible through a network (e.g., internet, intranet and the like).

In embodiments, the user interface 410 is communicatively coupled to the controller 403. In embodiments, the user interface 410 may include, but is not limited to, one or more desktops, laptops, tablets, and the like. In embodiments, the user interface 410 includes a display used to display data of the system 400 to a user. The display of the user interface 410 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 410 is suitable for implementation in the present disclosure. In embodiments, a user may input selections and/or instructions responsive to data displayed to the user via a user input device of the user interface 410.

Figure 5:
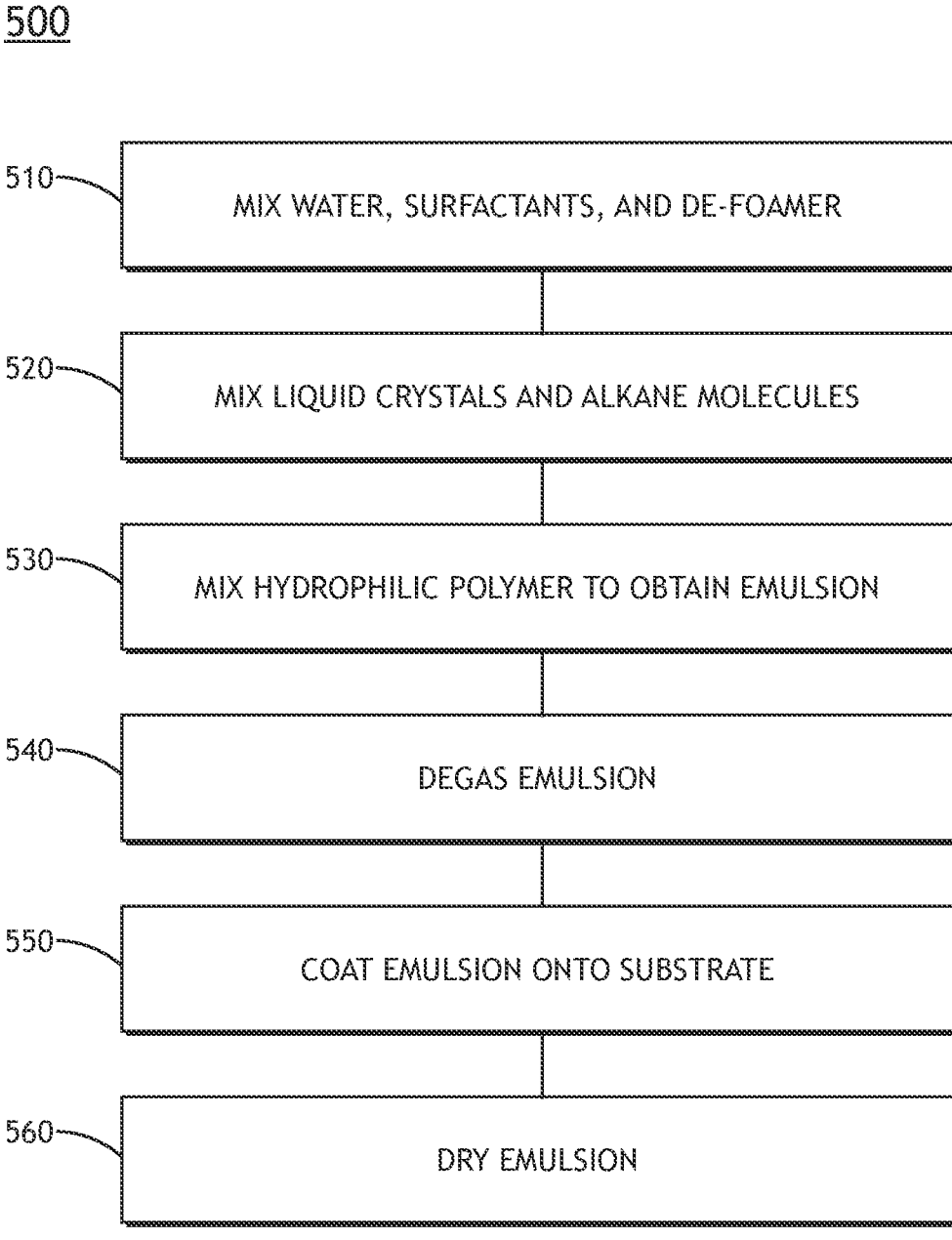
FIG. 5 illustrates a flow diagram of a method for making an electro-optic modulator, in accordance with one or more embodiments of the present disclosure.

Referring now to FIG. 5, a flow diagram of a method 500 is described, in accordance with one or more embodiments of the present disclosure. The method may also be referred to as a process of manufacturing an electro-optic modulator. The embodiments and the enabling technologies described previously herein in the context of the electro-optic modulator 100 and the modulator material layer 108 should be interpreted to extend to the method 500. It is further noted, however, that the method is not limited to the architecture of the electro-optic modulator 100.

In a step 510, water, surfactants, and defoamer are mixed to form the surfactant mixture. The step may perform the mixing for an extended duration (e.g., mixing overnight). The defoamer may include silica (e.g., surface treated silica) or the like.

In a step 520, the mixture is mixed with liquid crystal and an alkane additive. The mixture with the liquid crystal is mixed at a relatively high speed. The alkane molecules may range from 5 to 30% in weight of the liquid crystal. Between 5% and 30% by weight of the alkane molecules relative to the liquid crystal are mixed with the mixture.

In a step 530, a hydrophilic polymer aqueous emulsion is then mixed with the mixture to obtain an emulsion containing droplets of liquid crystals. The hydrophilic polymer aqueous emulsion may include hydrophilic polyurethanes or the like. By emulsifying the liquid crystal material, an electrical performance of the liquid crystal material may be improved. The liquid crystal may form smaller droplets that are dispersed within the polymer material. The droplets of liquid crystals range in size between 0.1 to 10 microns and may include an average size 1 to 3 microns. The liquid crystal molecules may be randomly oriented within the droplet when no electric field is applied. The liquid crystal/polymer materials may be emulsified in any manner, such as, but not limited to, using a mechanical force by a high-speed blade. A crosslinker, such as poly-aziridine or carbodiimide based crosslinker, is added at 0.05% to 3% range, followed by shaking by hand to mix it into the emulsion.

In a step 540, the emulsion is degassed. The emulsion is degassed under vacuum.

In a step 550, the emulsion is coated onto a substrate. The substrate may include an ITO-coated PET Mylar. For example, the substrate may include the transparent conductive layer 110 and the plastic film 112. Many wet coating methods can be used. Examples include wire wound rod, doctor blade, slot die, extrusion, spinning, spay, inkjet, etc.

In a step 560, the emulsion dried. In some embodiments, the emulsion may be dried at room temperature for a first duration and dried at an elevation temperature (e.g., in an oven at 40° C.) for a second duration. By drying, water in is evaporated from the mixture. Upon evaporation of the water, the droplets 202 of liquid crystal remains dispersed within the polymer matrix 204. The emulsion is thus dried to form the modulator material layer 108. The liquid crystal molecules may anchor to the polymer matrix. A degree of anchoring depends on the liquid crystal molecule and polymer chemistries. When an electric field is applied across the liquid crystal material, the liquid crystal molecules and/or droplets can at least partially align along the electric field direction. For such alignment to occur, the liquid crystal molecules and/or droplets overcome the anchoring and/or friction with the polymer at an attachment locus.

It is further contemplated that each of the embodiments of the method described above may include any other step(s) of any other method(s) described herein.

Referring generally again to FIGS. 1A-5, although the alkane molecules have been described as being added to electro-optic modulators of imaging systems, this is not intended as a limitation of the present disclosure. It is further contemplated that the alkane chains may be added to a number of aqueous based polymers. Such aqueous-based polymer may include a number of beneficial applications, such as, smart-window technology, sensors, or other nematic curvilinear aligned phase liquid crystal (NCAP) films. In solvent-based systems, polymer dispersed liquid crystal (PDLCs) films, polymer stabilized liquid crystal (PSLCs), polymer stabilized cholesteric liquid crystals (PSCLC) could be similarly improved.

The modulator material layer 108 may include one or more classes of material. Liquid crystal/polymer composite materials may generally be separated into a polymer dispersed liquid crystal (PDLC) film class and a nematic curvilinear aligned phase liquid crystal (NCAP) film class. Each of the PDLC film and the NCAP film may generally include liquid crystal droplets dispersed within a polymer matrix. In some embodiments, modulator material layer 108 is a PDLC film. In some embodiments, the modulator material layer 108 is an NCAP film, such as a water-soluble polymer-based NCAP film or a latex polymer-based NCAP film.

A first class of the modulator material is the PDLC film. The PDLC film may be fabricated in a number of ways. For example, the PDLC film may be fabricated by solvent induced phase separation (SIPS). The SIPS process may include dissolving a liquid crystal (LC) and polymer in a common solvent and then evaporating the solvent to allow the LC droplets to form. In some instances, the solvent is water, although this is not intended to be limiting. To further improve mechanical properties (such as toughness) of the final PDLC film, polymers that can be cross-linked are often used. By way of another example, the PDLC film may be fabricated by polymerization induced phase separation (PIPS). The PIPS process may include mixing LC and pre-polymers (and/or monomers), applying radiation (e.g., ultraviolet or visible light) to the mixture. The PIPS process may also include a mixture of catalyst, LC and pre-polymer followed by heat to form the PDLC film. Another example, the PDLC film may be fabricated by thermal induced phase separation (TIPS). The TIPS process may include heating a mixture of polymer and LC until the mixture becomes homogenous. The LC is then phase separated from the polymer during the cooling process.

A second class of the modulator material is the NCAP film. The NCAP film may be suitable for making very large area light valves and displays. The NCAP film is generally water-based, and can be further divided into several subclasses. For example, a subclass of NCAP films includes a water-soluble polymer, such as polyvinyl alcohol (PVA) or a urethane. The water-soluble polymer may be moisture sensitive because of the hydrophilic property of the water-soluble polymer. The water-soluble polymer-based NCAP film may include a two-phase material that includes liquid crystal and a water/polymer solution. By way of another example, a subclass of NCAP films includes a latex-based material. The latex-based NCAP film may include a three-phase material that includes water, liquid crystal, and latex-based material. The latex-based material includes a water-insoluble polymer. Latex particles may be dispersed in water with the liquid crystal. These latex particles can "fuse" into continuous polymer phase that is irreversible once the water is removed. Some applications using this latex-based NCAP have long-term electro-optical stability. The liquid crystal is distributed within the polymer, either latex or the residual polymer such as PVA, after drying.

During the formation of the modulator material layer 108, one or more surfactants (e.g., wetting agents), may be added to the aqueous mixture. The surfactants may improve an ability of the modulator material layer 108 to spread, due to a reduced surface tension.

As used throughout the present disclosure, the term "sample" generally refers to a substrate formed of a semiconductor or non-semiconductor material (e.g., thin filmed glass, or the like). For example, a semiconductor or non-semiconductor material may include, but is not limited to, monocrystalline silicon, gallium arsenide, indium phosphide, or a glass material. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A modulator material layer comprising:
a polymer matrix formed of a plurality of cross-linked polymer molecules;
a plurality of droplets of liquid crystals within the polymer matrix; and
a plurality of paraffinic alkane molecules dispersed within the plurality of droplets of liquid crystals; wherein the plurality of paraffinic alkane molecules are soluble in the plurality of droplets of liquid crystals and are insoluble in the polymer matrix; wherein the paraffinic alkane molecules comprise saturated hydrocarbons having between nine and sixteen carbon atoms, including at least one of linear isomers or branched isomers; and wherein the paraffinic alkane molecules reduce the switching voltage of the modulator material layer.

2. The modulator material layer of claim 1, wherein the plurality of alkane molecules comprise at least one of acyclic branched hydrocarbons or acyclic unbranched hydrocarbons; wherein the acyclic branched hydrocarbons or the acyclic unbranched hydrocarbons have a formula $C_nH_{2n+2}$; where n is an integer.

3. The modulator material layer of claim 2, wherein the plurality of alkane molecules comprise between nine and sixteen carbon atoms.

4. The modulator material layer of claim 3, wherein the plurality of alkane molecules comprise the acyclic unbranched hydrocarbons; wherein the plurality of alkane molecules comprise at least one of n-nonane, n-decane, n-undecane, n-dodecane, n-tridecane, n-tetradecane, n-pentadecane, or n-hexadecane.

5. The modulator material layer of claim 3, wherein the plurality of alkane molecules comprise the acyclic branched hydrocarbons.

6. The modulator material layer of claim 3, wherein the modulator material layer includes between 5% and 30% by weight of the plurality of alkane molecules relative to the liquid crystals.

7. The modulator material layer of claim 6, wherein the modulator material layer includes between 5% and 15% by weight of the plurality of alkane molecules relative to the liquid crystals.

8. The modulator material layer of claim 1, wherein the plurality of alkane molecules comprise alkyl cyclic hydrocarbons; wherein the cyclic hydrocarbons have a formula $C_nH_{2(n+1-r)}$, where n and rare each integers, where n is a number of carbon atoms and r is the number of rings.

9. The modulator material layer of claim 1, comprising a plurality of unsaturated hydrocarbon compounds dispersed within the plurality of droplets of liquid crystals; wherein the plurality of unsaturated hydrocarbon compounds are soluble in the plurality of droplets of liquid crystals.

10. The modulator material layer of claim 9, wherein the plurality of unsaturated hydrocarbon compounds comprise at least one of alkenes and alkynes.

11. The modulator material layer of claim 1, comprising mineral oil; wherein the mineral oil comprises a composition of the plurality of alkane molecules and a plurality of unsaturated hydrocarbon compounds; wherein the plurality of alkane molecules comprise at least one of acyclic branched hydrocarbons or acyclic unbranched hydrocarbons; wherein the plurality of alkane molecules comprise alkyl cyclic hydrocarbons; wherein the plurality of unsaturated hydrocarbon compounds comprise at least one of alkenes or alkynes; where the plurality of alkane molecules comprise at least one alkylated aromatic molecule.

12. The modulator material layer of claim 1, wherein the modulator material layer is a nematic curvilinear aligned phase (NCAP) film.

13. The modulator material layer of claim 1, wherein the modulator material layer is a polymer dispersed liquid crystal (PDLC) film.

14. The modulator material layer of claim 1, wherein the droplets range in size between 0.1 and 10 microns.

15. The modulator material layer of claim 1, wherein the plurality of alkane molecules are insoluble in the polymer matrix.

16. The modulator material layer of claim 1, wherein the liquid crystals are randomly oriented within the plurality of droplets while no electric field is present; wherein the liquid crystals at least partially align along a direction of an electric field while the electric field is applied across the modulator material layer.

17. An electro-optic modulator comprising:
a transparent conductive film;
a modulator material layer disposed on the transparent conductive film, the modulator material layer comprising:
a polymer matrix formed of a plurality of cross-linked polymer molecules;
a plurality of droplets of liquid crystals within the polymer matrix; and
a plurality of paraffinic alkane molecules dispersed within the plurality of droplets of liquid crystals; wherein the plurality of paraffinic alkane molecules are soluble in the plurality of droplets of liquid crystals and are insoluble in the polymer matrix; wherein the paraffinic alkane molecules comprise saturated hydrocarbons having between nine and sixteen carbon atoms, including at least one of linear isomers or branched isomers; and wherein the paraffinic alkane molecules reduce the switching voltage of the modulator material layer.

18. The electro-optic modulator of claim 17, wherein the liquid crystals and the plurality of alkane molecules are randomly oriented within the plurality of droplets while no electric field is present; wherein the liquid crystals at least partially align along a direction of an electric field while the electric field is applied across the modulator material layer; wherein the transparent conductive film generates the electric field.

19. The electro-optic modulator of claim 17, further comprising a glass substrate, wherein the modulator material layer is one of a direct coating onto the glass substrate or a lamination onto the glass substrate.

20. The electro-optic modulator of claim 17, wherein the plurality of alkane molecules are at least one of acyclic branched hydrocarbons or acyclic unbranched hydrocarbons; wherein the plurality of alkane molecules have a formula $C_nH_{2n+2}$; where n is an integer.

21. The modulator material layer of claim 20, wherein the plurality of alkane molecules comprise between nine and sixteen carbon atoms.

22. The modulator material layer of claim 17, wherein the modulator material layer includes between 5% and 30% by weight of the plurality of alkane molecules relative to the liquid crystals.

23. The modulator material layer of claim 17, wherein the plurality of alkane molecules comprise alkyl cyclic hydrocarbons; wherein the cyclic hydrocarbons have a formula $C_nH_{2(n+1-r)}$, where n and r are each integers, where n is a number of carbon atoms and r is the number of rings.

24. The modulator material layer of claim 17, comprising a plurality of unsaturated hydrocarbon compounds dispersed within the plurality of droplets of liquid crystals; wherein the plurality of unsaturated hydrocarbon compounds are soluble in the plurality of droplets of liquid crystals.

25. The modulator material layer of claim 24, wherein the plurality of unsaturated hydrocarbon compounds comprise at least one of alkenes and alkynes.

26. The modulator material layer of claim 17, comprising mineral oil; wherein the mineral oil comprises a composition of the plurality of alkane molecules and a plurality of unsaturated hydrocarbon compounds; wherein the plurality of alkane molecules comprise at least one of acyclic branched hydrocarbons or acyclic unbranched hydrocarbons; wherein the plurality of alkane molecules comprise alkyl cyclic hydrocarbons; wherein the plurality of alkane molecules comprise alkylated aromatic molecules; wherein the plurality of unsaturated hydrocarbon compounds comprise at least one of alkenes or alkynes.

27. An imaging system comprising:
an illumination source configured to generate illumination;
a stage for a sample;
a detector to generate an image of at least a portion of the sample; and
an electro-optic modulator disposed in a path of the illumination from the illumination source and separated from the sample by an air gap, wherein the electro-optic modulator comprises:
a transparent conductive film;
a modulator material layer disposed on the transparent conductive film, the modulator material layer comprising:

a polymer matrix formed of a plurality of cross-linked polymer molecules;
a plurality of droplets of liquid crystals within the polymer matrix; and
a plurality of paraffinic alkane molecules dispersed within the plurality of droplets of liquid crystals; wherein the plurality of paraffinic alkane molecules are soluble in the plurality of droplets of liquid crystals and are insoluble in the polymer matrix; wherein the paraffinic alkane molecules comprise saturated hydrocarbons having between nine and sixteen carbon atoms, including at least one of linear isomers or branched isomers; and wherein the paraffinic alkane molecules reduce the switching voltage of the modulator material layer.

28. The imaging system of claim 27, wherein the liquid crystals are randomly oriented within the plurality of droplets while no electric field is present; wherein the liquid crystals at least partially align along a direction of an electric field while the electric field is applied across the modulator material layer; wherein the transparent conductive film generates the electric field by capacitively coupling to the sample.

29. A method comprising:
obtaining an emulsion by mixing water, liquid crystals, a plurality of paraffinic alkane molecules, and a plurality of hydrophilic polymer molecules;

coating the emulsion onto a substrate; and drying the emulsion; wherein the emulsion forms a modulator material layer comprising:
a polymer matrix formed by cross-linking the plurality of hydrophilic polymer molecules;
a plurality of droplets of the liquid crystals within the polymer matrix; and
the plurality of paraffinic alkane molecules dispersed within the plurality of droplets of liquid crystals; wherein the plurality of paraffinic alkane molecules are soluble in the plurality of droplets of liquid crystals; wherein the paraffinic alkane molecules comprise saturated hydrocarbons having between nine and sixteen carbon atoms, including at least one of linear isomers or branched isomers; and wherein the paraffinic alkane molecules reduce the switching voltage of the modulator material layer.

* * * * *